United States Patent [19]

Leach

[11] 3,773,691

[45] Nov. 20, 1973

[54] REMOVAL OF RESIDUAL CARBON CONTAMINATES FROM ALUMINA

[75] Inventor: Bruce E. Leach, Ponca City, Okla.

[73] Assignee: Continental Oil Company, Ponca City, Okla.

[22] Filed: Dec. 23, 1971

[21] Appl. No.: 211,770

[52] U.S. Cl.................. 252/463, 423/625, 423/628, 423/630
[51] Int. Cl............................................ B01j 11/32
[58] Field of Search............................ 252/420, 463; 423/130, 627, 628, 630, 625

[56] References Cited
UNITED STATES PATENTS

| | | | |
|---|---|---|---|
| 2,917,366 | 12/1959 | Hansford | 252/463 |
| 2,749,216 | 6/1956 | Dinwiddie et al. | 252/463 |
| 3,384,458 | 5/1968 | McCarthy et al. | 252/463 |
| 3,669,904 | 6/1972 | Cornelius et al. | 252/463 |

Primary Examiner—Daniel E. Wyman
Assistant Examiner—P. E. Konopka
Attorney—Joseph C. Kotarski et al.

[57] ABSTRACT

An improved process for producing low bulk density, high porosity, high surface area alumina having a low residual carbon contamination content wherein the improvement comprises contacting said alumina with super heated steam to reduce the residual carbon contamination content.

4 Claims, No Drawings

REMOVAL OF RESIDUAL CARBON CONTAMINATES FROM ALUMINA

FIELD OF THE INVENTION

The present invention relates to a method for producing low bulk density, high porosity, high surface area alumina. The present invention further relates to an improved method for producing low bulk density, high porosity, high surface area alumina having a reduced residual carbon contamination content. The present invention further relates to an improved method for the production of said alumina having reduced residual carbon contamination content wherein the improvement comprises contacting said alumina with an effective amount of super heated steam.

PRIOR ART

Numerous processes such as the water hydrolysis of aluminum alkoxide, the alum process and sodium aluminate processes are known for the production of alumina. Such alumina has a variety of uses such as for catalysts, catalyst supports and the like. In many of these applications the usefulness of the alumina is directly related to the pore volume, surface area and density. Generally, lighter alumina having low bulk density, high surface area and high porosity is more desirable. Most processes produce alumina having loose bulk densities greater than about 35 lb/ft$^3$, a pore volume of less than about 1 cc/g. and surface areas lower than about 275 m$^2$/g. Recently it has been discovered that the alumina slurries produced by the water hydrolysis of aluminum alkoxides, the alum process and sodium aluminate processes may be contacted with an effective amount of organic solvent to form a solvent aqueous alumina slurry and dried to produce an alumina having a loose bulk density from about 7.5 to about 25 lb/ft$^3$, a surface area from about 275 to about 400 m$^2$/g and a pore volume from about 1 to about 2.75 cc/g. Such alumina is very desirable in catalytic applications and the like. However, the alumina so produced frequently has a substantial amount of residual carbon contamination as a result of the various production process steps and the like. As a result much time and effort has been devoted to developing a suitable method for removing or preventing such residual carbon contamination without substantially reducing the desirable alumina properties.

OBJECTS OF THE INVENTION

It is an object of the present invention to provide an improved process for the production of high porosity, high surface area, low bulk density alumina. It is a further objective of the invention to provide an improved process for the production of high surface area, high porosity, low bulk density alumina having a low residual carbon contamination.

SUMMARY OF THE INVENTION

It has now been found that the objectives of the present invention are achieved in methods for producing low density, high porosity, high surface area product alumina by contacting aqueous alumina slurries with an effective amount of organic solvent to form a solvent-aqueous alumina mixture, drying said mixture and recovering said product alumina by the improvement comprising contacting said product alumina with an effective amount of super heated steam.

DESCRIPTION OF THE PREFERRED EMBODIMENTS

Alumina is generally useful for a variety of catalytic and refractory applications. Low bulk density, high porosity, high surface area alumina is especially useful in catalytic applications such as chemical process catalysts and catalyst supports, catalyst linings for mufflers and the like. Such alumina has been produced by a process comprising contacting aqueous alumina slurries containing up to about 32 weight percent $Al_2O_3$ produced by the water hydrolysis of aluminum alkoxides, the alum process or sodium aluminate process with an effective amount of an organic solvent to form a solvent aqueous alumina mixture, drying said mixture and recovering low density, high porosity, high surface area alumina. These processes frequently result in an alumina product having desirable properties but containing high levels of residual carbon contamination. Such a process is more fully shown in U.S. Ser. No. 191,085, filed Oct. 20, 1971 entitled "High-Porosity, High-Surface Area, Low Bulk Density Alumina" by W. C. Ziegenhain.

The method of contacting is effective when at least enough solvent is added to form an azeotropic mixture of the solvent and the water present in the aqueous alumina portion so that the water may be removed by azeotropic evaporation during drying. Lesser amounts of solvent may be used to achieve improvement in alumina properties but it has been observed that more desirable results are obtained when an azeotropic amount is used. It has been found that very desirable results are obtained when up to about 20 percent excess solvent is used. References to proportions of solvent to water, solvent to alumina filter cake etc., as used herein are by weight unless otherwise stated.

For purposes of calculating the water present the alumina is treated as $Al_2O_3$ thus the water of hydration is treated as removable water even though such water is not usually removed in the early drying operations, i.e., usually an alumina hydrate such as alpha alumina monohydrate is the product from the first drying step although such alumina may be further dried or calcined to unhydrated alumina such as gamma alumina and the like. In the methods listed above it is necessary to have the azeotropic mixture described above only in the mixture immediately prior to drying, i.e., prior washes or contacting can be at any desired ratio.

Suitable solvents are ethanol, propanol, isopropanol, butanol, isobutanol and tertiary butanol. Other solvents such as methanol and acetone were tested, but found to be less desirable in achieving the desired reductions in bulk density and increases in porosity and surface area. The listed solvents all yield desirable products, but based primarily on economics and availability the ethanol and butanol are preferred; and of the two, butanol is preferred over ethanol since it is present in many processes where the methods of the present invention are useful.

Azeotropic mixtures of the suitable solvents are as follows.

| *Solvent | Wt. % Solvent | Wt. % Water | B.P. °C. |
|---|---|---|---|
| Ethanol | 95.5 | 4.5 | 78.1 |
| Propanol | 71.7 | 28.3 | 87.7 |
| Isopropanol | 87.9 | 12.1 | 80.4 |
| n-Butanol | 62 | 38 | 92.4 |
| Isobutanol | 66.8 | 33.2 | 90.0 |
| Tertiary Butanol | 88.3 | 11.7 | 79.9 |

*Langes Handbook of Chemistry, Ninth Edition, pages 1484-1485

The improvement of the present invention comprises contacting the alumina so produced with an effective amount of super heated steam to further dry the alumina and reduce the quantities of residual carbon contamination. In the practice of the present invention it is desirable that the product alumina contain from about 50 to about 85 weight percent $Al_2O_3$. Alumina as used herein refers to an apparently dry solid produced as alumina which may contain substantial quantities of free water, water of hydration and other trace materials. Particularly desirable results have been obtained wherein said alumina contains from about 60 to about 80 weight percent $Al_2O_3$. Below about 50 percent $Al_2O_3$ in the produced alumina, contacting with super-heated steam adversely effects the properties of the finished alumina. While we do not wish to be bound by any particular theory it is believed that contacting with superheated steam at $Al_2O_3$ concentrations below about 50 percent results in selectively removing the organic solvent thus reducing the effectiveness of the preceding process step wherein the alumina is produced by drying from a solvent-aqueous alumina mixture. At $Al_2O_3$ concentrations above about 85 weight percent it has been found that drying the alumina to such concentrations results in residual carbon material which is no longer subject to ready removal by steam contacting. It is believed that the severity of drying conditions necessary to dry the alumina to 85 weight percent $Al_2O_3$ results in conversion of the carbonaceous materials to materials which are non-hydrolyzable, non-water azeotropic, less volatile and generally less susceptible to steam contacting. As noted above the improvement of the present invention is effective in reducing carbon content without adversely affecting desirable alumina properties when alumina containing from about 50 to about 85 weight percent $Al_2O_3$ is used although preferred $Al_2O_3$ weight percentages are from about 60 to about 80 weight percent $Al_2O_3$. The improved process of the present invention has been found effective wherein said alumina is contacted with at least about 0.1 gram of super heated steam per gram of alumina. Larger quantities of steam may be used however it has been observed that above a steam to alumina weight ratio of about 0.5 the use of increasing quantities of steam has less and less effect per additional unit. In fact the use of excessive amounts of steam may be detrimental to the product alumina quality in some instances. Accordingly, the process of the present invention is desirably practiced by the use of steam to alumina weight ratios of about 0.1 to about 2.0.

References to steam or to super heated steam in the present description refer to steam which is heated above the normal boiling point of water at the pressures used so that no free water is present in said steam. Typically the steam used in the process of the present invention has a temperature of about 250° to 500°F. It has been found that at temperatures greater than about 500°F. the residual carbon contaminates tend to crack and lay down a carbon residue which is less susceptible to removal by continued steam contacting. Accordingly, preferred steam temperatures are about 250°–500°F. with a preferred steam temperature being about 250°–320°F. References to residual carbon, residual carbon contamination and the like in the present description is to be understood to refer to trace amounts of organic solvent remaining with the alumina product, other carbon contaminates which may be present and the like. Such materials will be referred to as percent carbon hereinafter. The alumina may be contacted with steam in any convenient manner which achieves intimate alumina-steam contact. Such methods are well known to those skilled in the art and will not be described further since any convenient method will be found effective.

In the practice of the present invention alumina produced by the process described above for the production of low density, high porosity, high surface area alumina is dried in the final process step to about 50–85 weight percent $Al_2O_3$ and thereafter further dried with super-heated steam to remove residual carbon contaminates and further dry the alumina. Many process variations and modifications in the above procedure are possible within the scope of the present invention and may appear obvious or desirable to those skilled in the art based upon the preceding description of preferred embodiments and the appended examples and claims.

EXAMPLE 1

Aluminum alkoxides produced by the Ziegler process were hydrolyzed to produce alumina slurry and alcohols. The alumina slurry so produced was treated with butanol in accordance with the process described above and dried to produce an alumina product containing about 72.5 weight percent $Al_2O_3$ and about 6.6 weight percent carbon. The composition stated is typical of the product produced in the pilot plant operation. The alumina so produced was subjected to a series of tests to evaluate the effects of contacting such alumina with super-heated steam under varying conditions. Table I below shows the effect of varying process temperatures.

TABLE I

| Test number | Residence time, min. | Product temperature, °F. | Grams/min. Steam feed rate | Grams/min. Alumina feed rate | Weight percent Carbon | Weight percent $Al_2O_3$* |
|---|---|---|---|---|---|---|
| 1 | 10 | 250 | 25 | 50 | 2.3 | 77.8 |
| 2 | 10 | 280 | 25 | 50 | 2.4 | 79.5 |
| 3 | 10 | 250 | 50 | 50 | 2.0 | |
| 4 | 10 | 280 | 50 | 50 | 1.9 | 79.9 |
| 5 | 10 | 250 | 100 | 50 | 2.1 | 77.9 |
| 6 | 10 | 280 | 100 | 50 | 1.8 | 79.6 |
| 7 | 10 | 280 | 25 | 100 | 3.7 | |
| 8 | 10 | 320 | 25 | 100 | 2.8 | |
| 9 | 10 | 280 | 50 | 100 | 2.6 | |
| 10 | 10 | 320 | 50 | 100 | 2.6 | 80.7 |
| 11 | 10 | 280 | 100 | 100 | 2.5 | |
| 12 | 10 | 320 | 100 | 100 | 2.0 | 80.1 |

* After steam contacting.

It will be observed that the data has been presented as a series of six pairs of tests. In each instance, a sample was selected, divided into two portions, and subjected to the drying conditions shown. In most instances it is clearly shown that the higher temperatures result in a greater reduction of the carbon content retained on the alumina, i.e., the initial carbon weight percent of about 6.6 has been reduced to the values shown. It is pointed out that while the starting alumina compositions stated are typical of the alumina produced some variation from sample to sample should be expected. Accordingly, comparisons other than as shown in the pairings are not true comparisons, i.e., Test 1 and 2 are comparable whereas Tests 2 and 3 are not comparable in that the starting aluminum material was not identical. No effort is made in Table I to show particulars as to the amount of carbon content reduction or the effect of variables other than process temperature. It is clearly shown in three of the six examples that increasing temperature improves the carbon removal achieved by the steam treatment. The remaining three sets of data are considered to be within the limits of the experimental error. In all tests the product temperature is equal to the steam temperature.

Table II below shows the effect of the steam to alumina weight ratio on carbon reduction.

TABLE II

| Test number | Residence time, min. | Product temperature, °F. | Steam feed rate (Grams/min.) | Alumina feed rate (Grams/min.) | Carbon, weight percent |
|---|---|---|---|---|---|
| 1 | 10 | 280 | 11 | 100 | 4.3 |
| 2 | 10 | 280 | 25 | 100 | 3.2 |
| 3 | 10 | 280 | 50 | 100 | 2.6 |
| 4 | 10 | 280 | 100 | 100 | 2.5 |
| 5 | 10 | 320 | 25 | 100 | 2.8 |
| 6 | 10 | 320 | 50 | 100 | 2.5 |
| 7 | 10 | 320 | 100 | 100 | 2.0 |
| 8 | 10 | 320 | 150 | 100 | 1.8 |
| 9 | 10 | 280 | 25 | 50 | 2.4 |
| 10 | 10 | 280 | 50 | 50 | 1.9 |
| 11 | 10 | 280 | 100 | 50 | 1.8 |

The data is shown in three sets. These sets represent three samples taken fromm the product stream and divided into the number of portions shown prior to treatment at the varying conditions. Accordingly, comparisons within the set are based on the same sample whereas comparisons of data from different sets are not based on identical samples. It is shown that as the steam feed rate to alumina feed rate ratio is increased improved carbon reductions are achieved. It is noted that increasing the steam feed rate above about 50 g/min based on an alumina feed rate of about 100 g/min has less and less effect as increasing quantities of steam are used.

Table III below shows the effect of residence time in steam-alumina contacting.

TABLE III

| Test number | Residence time, min. | Product temperature, °F. | Steam feed rate (Grams/min.) | Alumina feed rate (Grams/min.) | Carbon, weight percent |
|---|---|---|---|---|---|
| 1 | 2.5 | 280 | 25 | 50 | 2.2 |
| 2 | 5.0 | 280 | 25 | 50 | 2.4 |
| 3 | 10.0 | 280 | 25 | 50 | 2.4 |
| 4 | 20.0 | 280 | 25 | 50 | 2.0 |
| 5 | 0.62 | 280 | 25 | 50 | 2.1 |
| 6 | 1.25 | 280 | 25 | 50 | 2.4 |
| 7 | 2.5 | 280 | 25 | 50 | 2.3 |
| 8 | 5.0 | 280 | 25 | 50 | 2.3 |

The data is presented as two sets of data which are based on two separate samples taken from the product stream and divided into four portions each. Residence time was varied in the tests shown. It will be observed that within the limits tested residence time appears to have little effect upon the effectiveness of the steam treatment for removing carbon.

EXAMPLE 2

Further tests were run to show a direct comparison of alumina properties before and after steaming to remove carbon. An alumina slurry produced by the water hydrolysis of aluminum alkoxides produced by Ziegler process was used. 1,500 cc of water saturated butanol was mixed with 250 g. of the aqueous alumina cake, filtered and dried to about 65 weight percent $Al_2O_3$. The product alumina was divided into two portions. The first portion was dried with no steam present and a second portion was dried by contacting the alumina with a super-heated steam at 248°F. for about 40 minutes. Properties of the alumina produced without steaming and with steaming are shown in Table IV.

| | No steam contacting | Steam contacted |
|---|---|---|
| Loose bulk density, lb./ft.³ | 11.0 | 13.0 |
| Surface area, m.²/g | 352 | 292 |
| Carbon, weight percent | 6.55 | 0.42 |
| Cumulative pore volume, cc./g | 2.04 | 1.79 |
| Pore volume distribution as cc./g. at a pore diameter of: Angstrom: | | |
| 0-35 | 0.05 | 0.05 |
| 0-40 | 0.20 | 0.11 |
| 0-50 | 0.37 | 0.16 |
| 0-65 | 0.63 | 0.27 |
| 0-80 | 0.72 | 0.57 |
| 0-100 | 0.79 | 0.75 |
| 0-120 | 0.88 | 0.86 |
| 0-150 | 0.97 | 0.94 |
| 0-200 | 1.09 | 1.03 |
| 0-250 | 1.14 | 1.09 |
| 0-350 | 1.22 | 1.16 |
| 0-500 | 1.25 | 1.20 |
| 0-800 | 1.35 | 1.25 |
| 0-1,000 | 1.41 | 1.28 |
| 0-2,000 | 1.49 | 1.34 |
| 0-5,000 | 1.71 | 1.51 |
| 0-10,000 | 2.04 | 1.79 |

It will be observed that a slight loss of desirable properties has resulted from the steam treatment. However, it is pointed out that a significant carbon reduction has been achieved, i.e., the carbon level of 6.55 weight percent in the portion not contacting the steam was reduced to 0.42 weight percent in the portion contacted with steam. Such a significant reduction carbon content is the result of the rather severe steam treatment used and it is not to be expected that similar losses would occur in normal operation. In Table V below a similar set of tests was performed except that the steam treatment was conducted for about 10 minutes for about 120°C.

TABLE V

| | Before Steaming | After Steaming |
|---|---|---|
| Loose Bulk density (lb/ft³) | | |
| Surface Area (m²/g) | 310 | 302 |
| Carbon (wt %) | 6.6 | 2.0 |
| Cumulative Pore Volume (cc/g) | 2.00 | 1.92 |

It will be observed that a much less significant loss of desirable properties has taken place and that the carbon content has been reduced from about 6.6 weight percent to about 2 weight percent. The treatment shown in Table V is more typical than that shown in Table IV (see Tables I, II and III) and it is pointed out that a significant carbon weight percent reduction has been achieved with no substantial loss of desirable properties.

EXAMPLE 3

An alumina slurry was prepared by dissolving 164 g. of sodium aluminate ($NaAlO_2$) in two liters of water, precipitating the alumina by the addition of $CO_2$, filtering the alumina, washing the alumina to remove sodium ions, and refiltering the alumina. The alumina slurry so produced was divided into three portions. The first portion was dried from the aqueous slurry. The second portion was slurried with 1.5 g. of butanol per gram of wet filter cake and dried. The third portion was treated in the same manner as the second portion and thereafter steamed for 40 minutes at 120°C. The properties of the three portions after drying are shown in Table VI below.

TABLE VI

|  | First Portion | Second Portion | Third Portion |
|---|---|---|---|
| Surface area ($m^2/g$) | 282 | 303 | 312 |
| Loose bulk density ($lb/ft^3$) | 41 | 28 | 27 |
| Carbon (wt %) | 0.1 | 1.44 | 0.73 |

As shown, the method of the present invention is effective in reducing carbon content in alumina produced by processes other than the water hydrolysis of aluminum alkoxides. It is further pointed out that no loss of desirable properties has occurred as a result of the steam contacting to reduce the carbon content.

Having thus described the invention I claim:

1. In a method for producing low density, high porosity, high surface area alumina from an aqueous alumina slurry containing up to about 32 percent $Al_2O_3$ by contacting said aqueous alumina slurry with an effective amount of an organic solvent selected from the group consisting of ethanol, propanol, isopropanol, butanol, isobutanol and tertiary butanol to form a solvent-aqueous alumina mixture, azeotropically drying said mixture and recovering low density, high porosity, high surface area alumina containing from about 50 to about 85 weight percent $Al_2O_3$; the improvement comprising, contacting said low density, high porosity, high surface area alumina containing from about 50 to about 85 weight percent $Al_2O_3$ with from 0.1 to about 2.0 grams of superheated steam having a temperature from about 250° to 500°F per gram of alumina to produce low density, high porosity, high surface area alumina having a loose bulk density from about 7.5 to about 25 $lb/ft^3$, a pore volume from about 1.0 to about 2.75 cc/g, a surface area from about 275 to about 400 $m^2/g$ and a reduced carbon contamination content.

2. The improvement of claim 1 wherein said azeotropically dried alumina contains from about 60 to about 80 weight percent $Al_2O_3$.

3. The improvement of claim 1 wherein said azeotropically dried alumina contains about 72.5 weight percent $Al_2O_3$ and is contacted with from 0.1 to about 2.0 grams of superheated steam per gram of alumina at a temperature of about 250° to about 320°F for about 0.62 to about 20 minutes.

4. The improvement of claim 1 wherein said superheated steam has a temperature from about 250° to 320°F.

* * * * *